United States Patent Office 2,906,724
Patented Sept. 29, 1959

2,906,724

COMPOSITION CONTAINING POLYMETHYLOL MELAMINE AND AN AMMONIUM SALT OF A COPOLYMER OF AN UNSATURATED MONO-CARBOXYLIC ACID AND AN ALKYL ESTER OF SUCH AN ACID

John H. Daniel, Jr., Old Greenwich, Conn., assignor to American Cyanamid Company, New York, N.Y., a corporation of Maine No Drawing. Application March 21, 1957
Serial No. 647,490

14 Claims. (Cl. 260—45.2)

This invention relates to a novel composition of matter and, more particularly, to a composition of matter capable of producing glossy, continuous films comprising a physical mixture of a water-soluble potentially thermosetting polymethyl ether of a polymethylol melamine and a water-soluble ammonium salt of a copolymer of an alpha, beta-ethylenically unsaturated carboxylic acid and an alkyl ester of an alpha, beta-ethylenically unsaturated monocarboxylic acid. Still further, this invention relates to novel coating compositions which produce glossy films notwithstanding the fact that they are drawn down from aqueous dispersions of a mixture of resinous materials. Still further, this invention relates to coating compositions comprising aqueous dispersions of polymethyl ethers of polymethylol melamines in admixture with a water-soluble ammonium salt of a copolymer of an alpha, beta-ethylenically unsaturated carboxylic acid and an alkyl ester of an alpha, beta-ethylenically unsaturated monocarboxylic acid which aqueous dispersion is stable on standing even after prolonged storage.

One of the objects of the present invention is to prepare a novel composition of matter which is capable of producing glossy, continuous films comprising a water-soluble potentially thermosetting polymethyl ether of a polymethylol melamine and a water-soluble ammonium salt of a copolymer comprising an alpha, beta-ethylenically unsaturated carboxylic acid and an alkyl ester of an alpha, beta-ethylenically unsaturated monocarboxylic acid.

A further object of the present invention is to prepare coating compositions comprising aqueous dispersions of the novel compositions of the present invention which remain stable during prolonged storage and which produce glossy, continuous films. A further object of the present invention is to produce a coating composition which has greater utility in the coating resin art because of the fact that it is prepared in an aqueous solution which permits the use thereof without running the risk of significant fire hazard. These and other objects of the present invention will be discussed in greater detail hereinbelow:

In the preparation of the water-soluble copolymers used in the composition of the present invention, one of the essential reactants is an alpha, beta-ethylenically unsaturated carboxylic acid. This class of acids includes not only the monocarboxylic acids but includes as well the polycarboxylic acids. Amongst the monocarboxylic acids which may be used to prepare the copolymers of the present invention are such acids as acrylic, beta-benzoyl acrylic, methacrylic, cinnamic, crotonic and the like. Amongst the alpha, beta-unsaturated polycarboxylic acids which may be used in the preparation of the copolymers used in the present invention are the maleic, fumaric, itaconic, citraconic, mesaconic, aconitic; and the halogenated acids such as halogenated maleic, chloromaleic acid and the like. Quite obviously, these acids may be used either singly or in combination with one another. Whenever available, anhydrides of these acids may be used either singly or in combination with one another or with the acids.

As a second essential component to the water-soluble copolymers used in the present invention, there are the alkyl esters of the alpha, beta-unsaturated monocarboxylic acid such as methyl acrylate, ethyl acrylate, propyl acrylate, butyl acrylate, octyl acrylate, decyl acrylate, lauryl acrylate, ethyl methacrylate, butyl methacrylate, heptyl methacrylate, decyl methacrylate, propyl crotonate, butyl crotonate, nonoyl crotonate, and the like. These alkyl esters may be used either singly or in combination with one another.

There are certain other polymerizable vinylidene monomers such as those containing the polymerizable $CH_2=C<$ groups which may be used to advantage with the alpha, beta unsaturated carboxylic acids and the alkyl esters of the alpha, beta-ethylenically unsaturated monocarboxylic acids. Included in such groups are such polymerizable vinyl compounds as styrene, ortho-, meta- or para-alkyl styrenes such as the o-, m- or p-methyl, ethyl, propyl and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes such as $\alpha$-chloro styrene, ortho-, meta- or para-chloro styrenes, 2,4-dichloro styrene, 2,3-dichloro styrene, 2,5-dichloro styrene or the alkyl side chain styrenes such as $\alpha$-methyl styrene, $\alpha$-ethyl styrene and the like. Additionally, one may make use of such polymerizable vinyl monomers as acrylamide, methacrylamide, ethacrylamide, ethylenebisacrylamide, N-tertiarybutylacrylamide and the like. These additional monomers may be used either singly or in combination with one another or may be left out of the composition entirely. The amount of monomer of diminished water solubility will vary considerably and directly in amount with the available hydrophilic groups in the polymer. When 50% of acrylic acid is used in the polymer, larger amounts of a monomer such as styrene may be used whereas when 5% of acrylic acid is used, little or no styrene should be used. As a result of this limitation, it is generally advisable to use not more than 25% by weight of these polymerizable monomers in the total weight of the ultimate copolymer comprising the ethylenically unsaturated acid and the alkyl ester of the ethylenically unsaturated monocarboxylic acid.

The copolymers used in the present invention are rendered water-soluble by reaction with ammonium hydroxide to form the ammonium salt of the copolymer. The amount of ammonium hydroxide used to produce the water-soluble salt of the copolymer may be varied over a fairly wide range. For instance, one may use a sufficient amount of ammonium hydroxide to form the half salt by using ½ mol equivalent of ammonium hydroxide per mol of carboxyl groups available in the copolymer as produced. One may furthermore use a full equivalent of ammonium hydroxide per mol equivalent of carboxyl group present in the copolymer as prepared. Still further, one could use an excess of ammonium hydroxide to insure complete salt formation in amounts up to and even exceeding 4 mol equivalents of ammonium hydroxide per mole of carboxyl group present in the copolymer.

As the second principal component of the composition mixture of the present invention, one will use the water-soluble potentially thermosetting polymethyl ethers of polymethylol melamines. The polymethyl ether will encompass the dimethyl ether, the trimethyl ether, the tetramethyl ether, the pentamethyl ether and the hexamethyl ether of polymethylol melamines. In preparing the polymethylol melamines, one must react at least 2 mols of formaldehyde and preferably at least 3 mols of formaldehyde with each mol of melamine under known reaction conditions in order to produce the water-soluble polymethylol melamine such as trimethylol melamine and the like. The preferred methyl ether of polymethylol melamine is the hexamethoxyhexamethylol melamine.

The ratio of the water-soluble potentially thermosetting polymethyl ether of polymethylol melamine to the water-soluble ammonium salt of the copolymer may be varied over a fairly wide range. For instance, one may use between about 10% to about 50% by weight of the methylol melamine material to a corresponding 90%–50% by weight of the water-soluble copolymer.

The water soluble copolymers used in the composition of the present invention may be prepared by reacting alkyl esters of alpha, beta unsaturated monocarboxylic acids and alpha, beta unsaturated carboxylic acids in proportions which vary over a fairly wide range. For instance, one may use between about 50% and 95% by weight of the alkyl esters of the alpha, beta unsaturated monocarboxylic acids to a correspondingly 50%–5% by weight of the alpha, beta unsaturated carboxylic acids. Preferably, one would use about 75–90% by weight of the alkyl ester of the alpha, beta ethylenically unsaturated monocarboxylic acid to about 25–10% by weight of the alpha, beta ethylenically unsaturated carboxylic acid. If a third component of the class described hereinabove is to be utilized in the preparation of these water-soluble copolymers, it may be present in an amount up to about 25% by weight based on the total weight of the copolymer solids.

In the use of these mixtures of the thermosetting resin-forming reaction products with the water-soluble copolymers of the present invention, it is not imperative that a catalyst be used, although one may be used as a matter of choice. The catalyst used may be any of the conventional catalytic materials, many of which have been disclosed in the prior art and which are water soluble or at least water dispersible. The amount of catalyst which may be used obviously can be varied over a considerable range, as the prior art clearly teaches.

The compositions of the present invention have a considerable number of advantages over the prior art compositions, particularly when these compositions are being used as coating compositions. In addition to the already mentioned advantage of not presenting a fire hazard threat, the compositions of the present invention are of very low toxicity, the solvent, being water, is far more desirable than the toxic solvents such as xylol and even the less toxic organic solvents such as mineral spirits. Additionally, the compositions of the present invention can be prepared far less expensively than their organic solvent equivalents and thus make the compositions of the present invention more desirable because they are far cheaper.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with stirrer, thermometer and reflux condenser, there is introduced 67.5 parts of dioxane. The charge is heated gradually to the reflux temperature by heating on an oil bath. After the dioxane has reached reflux, a mixture of 378 parts of ethyl acrylate, 107.5 parts of acrylic acid, and 122 parts of a 1% solution of butyl mercaptan in ethyl acrylate are introduced in relatively small increments over a 2 hour period. Concurrently but separately, over the same period of time, there is added 12.2 parts of cumene hydroperoxide. After the addition is completed, reflux is continued for about 5 hours. 200 parts of the copolymer thus prepared are dissolved in 220 parts of a mixture of 1 part of concentrated ammonia (29% NH$_3$) to 4 parts of water. An additional 80 parts of water is added to give an aqueous solution of 36% solids concentration of the copolymer. The solvent dioxane is used in the present example in an amount approximating 10% of the total charge. At the end of the polymerization reaction, this solvent may be stripped off under vacuum but it is preferred to leave said solvent in since its removal is not economically justifiable and since this solvent is completely water miscible.

*Example 2*

An enamel is prepared from 125 parts of rutile titanium dioxide and 289 parts of the 36% solids solution of the copolymer prepared according to Example 1 by grinding the mixture in a 3 roll roller mill. After a satisfactory dispersion is obtained, 156 parts of the 36% copolymer-titanium dioxide mixture, 43.5 parts of the dimethyl ether of trimethylol melamine and 403 parts of water are mixed to give a dispersion suitable for spray coating purposes. A sprayed panel is air dried for 20 minutes at room temperature and is then baked for 20 minutes at 300° F. The coating thus produced is hard and glossy and has good color.

*Example 3*

Into a suitable reaction vessel equipped with stirrer, thermometer, reflux condenser and two graduated funnels, there is introduced 149.6 parts of dioxane and the charge is heated to reflux. To the refluxing charge, there is added a mixture of 64 parts of butyl acrylate, and 10.8 parts of acrylic acid in small increments over a period of about 2 hours. Separately but concurrently there is added a total of 6 parts of cumene hydroperoxide under the same conditions. After the addition of monomer and catalyst is completed, refluxing is continued for about 6 hours. The solvent is stripped off by means of vacuum distillation to give a clear, viscous copolymer. An aqueous solution of the copolymer is prepared by dissolving said copolymer in 0.5 to 2.0 equivalents of dilute ammonium hydroxide to give a 40% solids solution of the copolymer.

*Example 4*

A blend of 2 parts of the copolymer in solution prepared according to Example 3, and 1 part of dimethyl ether of trimethylol melamine is prepared to give a fairly viscous liquid of 47.3% solids. Films drawn down on glass and steel panels are baked for 20 minutes at 120° C., 15 minutes at 150° C., and 15 minutes at 200° C. The film on steel showed the following test results:

Water resistance ____ No effect after 24 hours.
NaOH (0.5 N) _____ No effect after 3 days.
Methyl Cellosolve___ No effect after 1 hour, slight superficial attack after 24 hours.
Acetone _____ Satisfactory after 1 hour, failed after 18 hours.
Impact test _____ Satisfactory front 10 inch pounds, failed back 2 inch pounds.

The films prepared from this blend thus show good resistance to water, dilute alkali and alcoholic organic solvents. Pigmented coatings show a high degree of gloss and color and outstanding color retention after overbaking.

*Example 5*

128 parts of dioxane are introduced into a suitable reaction vessel equipped with stirrer, thermometer, reflux condenser and a graduated funnel and are heated to the reflux temperature whereupon a mixture of 46 parts of n-octyl acrylate, and 18 parts of acrylic acid are added in small increments over about a 2 hour period. 5.1 parts of cumene hydroperoxide are added concurrently but separately under the same increment addition conditions. The refluxing is continued after the addition is completed for a period of about 5½ to 6 hours. The dioxane is stripped off by a means of vacuum distillation to give a clear viscous copolymer. A completely clear solution of the copolymer in water is prepared by introducing ten parts of the copolymer into a mixture of 21.4 parts of dilute ammonium hydroxide (concentrated NH₄OH to H₂O, 1:4, respectively), 6 parts of ethanol and a sufficient amount of water to give 50 parts of solution. After stirring the solution is completely clear.

*Example 6*

A 20% ammonium hydroxide solution of the copolymer of Example 5 is mixed with an 80% solids solution in water of the dimethyl ether of trimethylol melamine in a ratio of 2 parts of copolymer to 1 part of the methyl ether of the methylol melamine solids. Each component is expressed in resin solids. Films drawn down from the mixture by using an applicator blade on glass and steel panels are baked as in the Example 4. The films produced are hard, glossy and displayed marked resistance to water, dilute alkali and organic solvents. From an adhesion standpoint, however, the films were not quite as good as those produced according to Example 4.

*Example 7*

A tripolymer is prepared in the same manner as in Example 1, in which 9 mols of butyl acrylate, 5 mols of acrylic acid and 1 mol of styrene are copolymerized. The ammonia solution containing 1 mol equivalent of ammonium hydroxide per mol of acrylic acid in the copolymer is clear and viscous at 32% solids. A blend of the above copolymer solution with the dimethyl ether of trimethylol melamine on a 2:1 solids basis, respectively, gave clear, hard films following a baking schedule such as in Example 4. By including a few percent of a water miscible organic solvent, such as the monomethyl ether of ethylene glycol, the appearance of the film is improved.

*Example 8*

Into a suitable reaction vessel equipped with stirrer, thermometer and reflux condenser, there is introduced 158 parts of dioxane. The charge is heated to the reflux temperature and there is then added 1.58 parts of cumene hydroperoxide followed gradually by a mixture of 57.6 parts of butyl acrylate and 10.8 parts of acrylic acid. Separately, there is added gradually 10.7 parts of acrylamide dissolved in 40 parts of dioxane. The monomer addition is accomplished at a gradual uniform rate over a 2 hour period. Three additional portions of cumene hydroperoxide, each equal to the first, are added at half-hour intervals. When the addition of catalyst and monomer has been completed, the reaction mixture is heated for about 6 hours. At this point, a small sample is tested for non-volatile content and from the determination, it is found that the polymerization is substantially complete. The solvent is then stripped off under vacuum at a low temperature and a 33⅓% solution of the tripolymer is made up by dissolving 29 parts of the tripolymer in 7 parts of concentrated ammonium hydroxide (29% NH₃) and the total is diluted with water to 87 parts. A blend of this tripolymer solution and the dimethyl ether of trimethylol melamine is prepared in a ratio of 2 parts of the tripolymer to 1 part of melamine derivative, both calculated on a solids basis. A thin film is drawn down on a glass panel and is allowed to air dry and then is subjected to the following baking schedule: 30 minutes at 80° C., 30 minutes at 120° C. and 15 minutes at 150° C. The coatings obtained in this way were clear and hard and showed no softening after 24 hours immersion in water.

*Example 9*

Into a suitable reaction vessel equipped as before, there is introduced 97.4 parts of dioxane and the charge is heated to reflux. A monomer mixture of 756 parts of butyl acrylate and 127.2 parts of acrylic acid together with 3.54 parts of butyl mercaptan is added gradually at a uniform rate over a period of 4 hours. During this addition, there is added separately, in small increments, 17.7 parts of ditertiary butyl peroxide. When the addition of the monomers and the catalyst is complete, the charge is maintained at the reflux temperature with constant stirring for about 3 additional hours. The resulting viscous copolymer is cooled to about 90° C. and there is then added gradually, with constant stirring, to a dilute aqueous solution of ammonia prepared by adding 211 parts of concentrated ammonium hydroxide (29% NH₃) to 948 parts of water. When the copolymer is completely uniformly dissolved, 9.3 parts of p-toluene sulfonic acid monohydrate is added and thoroughly mixed. This water soluble resinous composition had a color of less than 1 (Gardner 1933) had an appearance of a clear solution, a pH of 9–10 and a viscosity of 3000–9000 centipoises at 25° C. The non-volatile solids were approximately 52%±2%. A white enamel, suitable for application by the usual spraying or brushing techniques, is prepared by grinding together titanium dioxide pigment in a ratio of 3 parts of pigment to 1 part of the water soluble resin (both parts expressed on a solids basis) on a 3 roller mill and then, additional parts of resin are added so that the final ratio is 100% pigment to 100% resin or a 1:1 weight basis. After the addition of a sufficient amount of water to render the enamel sprayable, the enamel is sprayed onto steel panels. The panels are permitted to air dry for about 20 minutes at room temperature and then are baked for 30 minutes at 300° F. The finish obtained in this manner is hard and glossy and shows especially good resistance to water and satisfactory resistance to other agents such as 5% solutions of sodium hydroxide, 50% solutions of acetic acid, dilute synthetic detergent solutions at elevated temperatures. When a similarly coated panel is given an additional heat treatment for 5 minutes at 425° F., it suffers very little in gloss or color. Under these same conditions of higher temperature heating, a conventional finish comprising a blend of an alkyd resin and melamine resin applied from an organic solvent undergoes marked deterioration in color and gloss.

It will be quite apparent to those skilled in the art that other pigments may be used to produce a broad variety of colored enamels or, if desired, pigments or dyes or other coloring materials may be omitted to produce clear, transparent finishes. With certain pigments, it may be desirable and sometimes advantageous to use them in the form of aqueous slurries since, in the course of their preparation, they are generally obtained in admixture with varying amounts of water as a result of filtration. For use with organic solvents, these pigments must be thoroughly dried, but when an aqueous solvent is involved, the drying of the pigments is unnecessary.

The use of hexamethyl ether of hexamethylol melamine as the potentially thermosetting melamine-formaldehyde methyl ether component, is preferred over a less highly substituted melamine such as the dimethyl ether of trimethylol melamine since greater storage stability of the blend results.

Enamels prepared with titanium dioxide as the pigment with the hexamethyl ether of hexamethylol melamine produce baked films which show no lowering of gloss after the enamel has been stored at room temperature for 3 months compared to a film prepared immediately after the enamel was prepared. This indicates continued compatibility of the components, even after prolonged storage. Generally, the lower methylated and methylolated melamines have not shown such storage stability so that the enamels would have to be used within a few weeks or month after being mixed.

This application is a continuation-in-part of my earlier application having the Serial No. 529,349, filed August 18, 1955, now abandoned, having the title "Composition and Process of Preparing the Same," in which I disclose coating compositions comprising certain aminoplast resin-forming compositions in admixture with certain ammonium salts of copolymeric materials dispersed in an aqueous medium.

1. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an ethylenically unsaturated carboxylic acid and (b) 50% to 95% by weight of an alkyl ester of an alpha, beta-ethylenically unsaturated monocarboxylic acid.

2. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an alpha, beta-ethylenically unsaturated monocarboxylic acid and (b) 50% to 95% by weight of an alkyl ester of an alpha, beta-ethylenically unsaturated monocarboxylic acid.

3. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of acrylic acid and (b) 50% to 95% by weight of an alkyl ester of an alpha, beta-ethylenically unsaturated monocarboxylic acid.

4. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of acrylic acid and (b) 50% to 90% of butyl acrylate.

5. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of acrylic acid and (b) 50% to 90% of butyl acrylate and (c) up to 25% by weight of acrylamide.

6. A composition of matter capable of producing glossy, continuous films comprising a mixture of (1) 50% to 10% by weight of the hexamethyl ether of hexamethylol melamine and (2) 50% to 90% by weight of a water-soluble ammonium salt of a copolymer comprising (a) 5% to 50% by weight of acrylic acid and (b) 50% to 95% of butyl acrylate.

7. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of methacrylic acid and (b) 50% to 95% by weight of an alkyl ester of an alpha, beta-ethylenically unsaturated monocarboxylic acid.

8. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of methacrylic acid and (b) 50% to 95% by weight of butyl acrylate.

9. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a coplymer comprising (a) 5% to 50% by weight of methacrylic acid and (b) 50% to 95% by weight of ethyl acrylate.

10. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an ethylenically unsaturated carboxylic acid and (b) 50% to 95% of an alkyl ester of acrylic acid.

11. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an ethylenically unsaturated carboxylic acid and (b) 50% to 95% by weight of an alkyl ester of methacrylic acid.

12. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of an ethylenically unsaturated carboxylic acid and (b) 50% to 95% of butyl acrylate.

13. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a coplymer comprising (a) 5% to 50% by weight of an ethylenically unsaturated carboxylic acid and (b) 50% to 95% of ethyl acrylate.

14. A composition of matter capable of producing glossy, continuous films comprising a mixture of (1) 50% to 10% by weight of a water-soluble potentially thermosetting polymethyl ether of a polymethylol melamine and (2) 50% to 90% by weight of a water-soluble ammonium salt of a copolymer comprising (a) 5% to 50% by weight of acrylic acid and (b) 50% to 95% of ethyl acrylate.

References Cited in the file of this patent

UNITED STATES PATENTS

| | | |
|---|---|---|
| 2,469,408 | Powers et al. | May 10, 1949 |
| 2,653,140 | Allenby et al. | Sept. 22, 1953 |